United States Patent [19]

Daryanani

[11] 3,919,502

[45] Nov. 11, 1975

[54] BALANCING NETWORK FOR VOICE FREQUENCY TELEPHONE REPEATERS

[75] Inventor: Gobind Tahilram Daryanani, Middletown, N.J.

[73] Assignee: Bell Telephone Laboratories, Incorporated, Murray Hill, N.J.

[22] Filed: Aug. 19, 1974

[21] Appl. No.: 498,407

[52] U.S. Cl. .......................... 179/170 D; 333/80 R
[51] Int. Cl.[2] .......................................... H04B 1/52
[58] Field of Search ..... 179/170 R, 170 D, 170 NC; 333/8, 11, 32, 33, 80 R, 80 T

[56] References Cited

UNITED STATES PATENTS

| | | | |
|---|---|---|---|
| 3,401,352 | 9/1968 | Mitra | 333/80 R |
| 3,643,184 | 2/1972 | D'Alessandro | 333/80 R |
| 3,754,196 | 8/1973 | Collins | 333/32 |

OTHER PUBLICATIONS

Applications Manual for Operational Amplifiers, for Modeling, Measuring, Manipulating . . . , George A. Philbrick Researches, Inc., 2nd Edition 1966, pp. 96–97.

*Primary Examiner*—William C. Cooper
*Assistant Examiner*—Randall P. Myers
*Attorney, Agent, or Firm*—G. E. Murphy; W. Ryan

[57] ABSTRACT

An active circuit arrangement for realizing a driving point impedance. Embodiment as adjustable balancing networks in voice frequency telephone repeaters for nonloaded and loaded telephone cable facilities is disclosed. Each embodiment is capable of balancing a wide range of telephone cables and includes adjustable resistance means for independently establishing the impedance scalar factor and the impedance pole-zero configuration.

24 Claims, 6 Drawing Figures

BALANCING NETWORK FOR VOICE FREQUENCY TELEPHONE REPEATERS

BACKGROUND OF THE INVENTION

This invention relates to wave transmission and more particularly to a circuit arrangement for the realization of a desired impedance.

In many circuit applications, it is necessary to provide an electrical network having a specified input or driving point impedance. One circuit in which the realization of a rather precise impedance function is necessary is the balancing network of a telephone circuit hybrid network. Hybrid networks are used in a variety of telephone circuit applications, including telephone repeaters which are placed at spaced intervals along a telephone transmission path to compensate for signal degradation. A telephone hybrid circuit is a biconjugate four-port network which is utilized to perform two-wire to four-wire conversion, that is, to separate a bilateral or bidirectional two-wire transmission line into separate pairs, one pair for each of the two directions of transmission. In a majority of telephone hybrids the two unidirectional lines are connected to one set of the conjugate ports and the bidirectional transmission line and a balancing network are individually connected to the other set of conjugate ports. An impedance mismatch between the telephone line and the hybrid balancing network can result in a signal reflection which, in turn, can result in instability or singing of amplifiers in the telephone circuit, or can result in echoes which are subjectively objectionable to the telephone user. Accordingly, to provide satisfactory telephone communications, the hybrid balancing network must closely match or simulate the telephone line impedance. Present day telephone transmission facilities present a wide range of impedances, since the transmission loop may be of various or mixed gauge construction, may be loaded or nonloaded, and may or may not include bridge-tap sections. In the prior art, it has thus often been necessary to either construct precision balancing networks which could be adjusted to match the line impedance of a number of installations or to manufacture a large number of different balancing networks. In any case, the prior art balancing networks have often been complex and rather large in size. Moreover, prior art adjustable balancing networks have often included a large number of switchable or adjustable components and have thus required an elaborate and time-consuming installation adjustment.

It is therefore an object of this invention to obtain a circuit arrangement which can realize virtually any stable driving point impedance function.

It is a further object of this invention to provide a balancing network which is usable in a telephone system repeater to simulate the impedance of a wide range of telephone lines.

It is a still further object of this invention to provide an adjustable balancing network which contains a minimum number of switches and can thereby be used to easily and rapidly establish a large plurality of impedances useful within a hybrid circuit of a telephone repeater system.

SUMMARY OF THE INVENTION

These and other objects are achieved in accordance with this invention by a circuit arrangement which comprises a buffer or isolation amplifier, the output terminal of which is connected to one input terminal of an operational summing amplifier and also to the input terminal of a circuit stage for realizing a predetermined voltage transfer ratio. The output terminal of the voltage transfer ratio stage is connected to the second input terminal of the operational summing amplifier and the summing amplifier output terminal is connected to the input terminal of the buffer amplifier by means of a feedback resistor. The driving point impedance obtained at the input terminal of the buffer amplifier is a ratio of the feedback resistance to the voltage transfer ratio. Since a variety of circuits can be used to realize predetermined voltage transfer ratios, the heretofore difficult problem of realizing reliable and stable driving point impedance functions is reduced to the more easily handled realization of a transfer voltage ratio circuit wherein the zeros and poles of the circuit transfer function correspond respectively to the poles and zeros of the desired driving point impedance.

DETAILED DESCRIPTION

Figure 1:
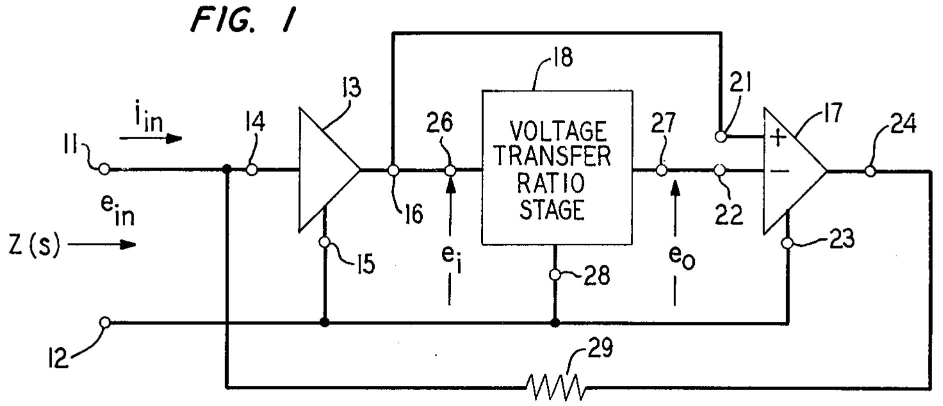
FIG. 1 is a block diagram representation of a circuit arrangement for realizing a predetermined driving point impedance in accordance with this invention.

FIG. 1 depicts the basic circuit of the present invention for realizing virtually any driving point impedance between terminals 11 and 12. In FIG. 1, input terminal 14 of operational amplifier 13, which serves as a buffer or isolation amplifier, is connected to circuit input terminal 11. Output terminal 16 of amplifier 13 is connected to a first input terminal 21 of operational amplifier 17 and is also connected to input terminal 26 of voltage transfer ratio stage 18. Output terminal 27 of voltage transfer ratio stage 18 is connected to a second input terminal 22 of operational amplifier 17, and output terminal 24 of operational amplifier 17 is connected to input terminal 14 of buffer amplifier 13 via feedback resistor 29. Circuit common terminals 15, 28, and 23 of buffer amplifier 13, voltage transfer ratio stage 18, and operational amplifier 17 each connect to common input terminal 12.

Voltage transfer ratio stage 18 is a circuit having a transfer function or output voltage to input voltage relationship which may be expressed as $$T(s) = \frac{e_o}{e_i} = K \cdot \frac{\Pi_{i=1}^{k}(s+Z_i)}{\Pi_{i=1}^{k}(s+P)} \cdot \frac{\Pi_{i=1}^{n}\left(s^2+\frac{\omega_{Zi}}{Q_{Zi}}s+\omega_{Zi}^2\right)}{\Pi_{i=1}^{n}\left(s^2+\frac{\omega_{Pi}}{Q_{Pi}}s+\omega_{Pi}^2\right)}$$

where the operator II denotes the chain multiplication of all $k$ real singularities and all $n$ complex conjugate singularities, $K$ is a scalar gain factor, $s$ denotes the frequency operator $jw$, $Z_i$ and $P_i$ denote the "$ith$" real zero, and real pole, respectively, $\omega_{Zi}$ and $\omega_{Pi}$ denote the "$ith$" pair of complex conjugate zeros and poles, respectively, and $Q_{Zi}$ and $Q_{Pi}$ respectively denote the $Q$ of the $ith$ zeros and poles. As is well known in the circuit art, a wide variety of passive and active circuit synthesis techniques exist for precisely realizing transfer functions of this type. As will be understood, certain transfer voltage ratio circuits can be especially advantageous in the practice of this invention. For example, the nonloaded and loaded telephone cable balancing network embodiments described herein employ two types of active biquadratic filter networks which permit independent control of those poles and zeros necessary to balance the transmission line while simultaneously exhibiting low sensitivity to changes in component values.

In the circuit arrangement of FIG. 1, amplifier 13 can be of either the inverting or the noninverting variety. If amplifier 13 is a noninverting buffer stage, voltage transfer ratio stage 18 is connected between the output terminal of amplifier 13 and the inverting input terminal of operational amplifier 17. Conversely, if amplifier 13 is an inverting stage, voltage transfer ratio stage 18 is connected between the output terminal of amplifier 13 and the noninverting input terminal of amplifier 17. Upon understanding the present invention, it will be realized that the circuit arrangement which employs a noninverting buffer amplifier is somewhat preferable, since the amplifier input impedance is normally higher than that attainable with an inverting stage.

Regardless of which type buffer amplifier is employed, it can be shown that when a voltage $e_{in}$ is applied between terminals 11 and 12 of the circuit of FIG. 1, the output voltage of operational amplifier 17 is $(1 - T_{(s)})e_{in}$. Assuming that the input impedance of buffer amplifier 13 is infinite, an assumption often made with operational amplifiers, it will be realized that the circuit input current flows through resistor 29 and can be expressed as $$i_{in}\ \frac{e_{in}(T_{(s)})}{R_{29}}$$

Accordingly, it can be seen that the circuit input impedance is $$Z(s) = \frac{T_{(s)}}{R_{29}}.$$

Thus, the impedance looking into the port formed by terminals 11 and 12 is $$Z(s) = \frac{R_{29}}{K}\ \frac{\Pi_{i=1}^{k}(s+P_i)}{\Pi_{i=1}^{k}(s+Z_i)}\ \frac{\Pi_{i=1}^{n}\left(s^2+\frac{\omega_{Pi}}{Q_{Pi}}s+\omega_{Pi}^2\right)}{\Pi_{i=1}^{n}\left(s^2+\frac{\omega_{Pi}}{Q_{Pi}}s+\omega_{Zi}^2\right)} \quad (1)$$

That is, the input impedance or driving point impedance of the present invention is a scalar factor, determined by the value of the feedback resistor, multiplied by the inverse of the transfer function of circuit stage 18. Since a wide variety of circuit techniques exist for designing passive and active circuits having precise left-hand pole-zero configurations, the circuit arrangement of FIG. 1 permits the precise realization of virtually any stable impedance function. Thus, in essence, this circuit configuration overcomes prior art limitations in the design of circuits for realizing driving point impedances by reducing the problem to the more easily handled task of realizing a circuit having a predetermined voltage transfer ratio whose zero and pole locations respectively correspond to the pole and zero locations of the desired driving point impedance.

EMBODIMENT AS A TELEPHONE HYBRID BALANCING NETWORK IN A NONLOADED CABLE FACILITY

In utilizing the circuit configuration of FIG. 1 as a hybrid balancing network in a nonloaded cable facility, it has been found that substantially all present-day telephone cables, including installations of various lengths of 19, 22, 24, and 26 gauge cable; mixed gauge cable installations; installations with both normal telephone and PBX trunk terminations; and installations which include a substantial length of a bridge-tap located at any point along the cable length, can all be adequately simulated by a biquadratic impedance function, that is, an impedance function having two poles and two zeros. Moreover, it has been found that normal telephone return loss objectives can be met for all of the above-mentioned nonloaded cable configurations by a balancing network having a biquadratic impedance expressed as $$Z(s) = K_n\ \frac{(s+Z_1)}{(s+P_1)}\ \frac{(s+Z_F)}{(s+P_F)} \quad (2)$$

where $K_n$ is a scalar multiplier, $Z_1$ and $P_1$ are a controllable or adjustable zero and pole, respectively, and $Z_F$ and $P_F$ are respectively a fixed or nonadjustable zero and pole.

In view of Equation (1) it can be observed that a driving point impedance of this form can be provided by the circuit configuration of FIG. 1 wherein the transfer function of circuit stage 18 is established as $$T(s) = \frac{R_F}{K_n}\ \frac{(s+P_1)}{(s+Z_1)}\ \frac{(s+P_F)}{(s+Z_F)}$$

Figure 2:
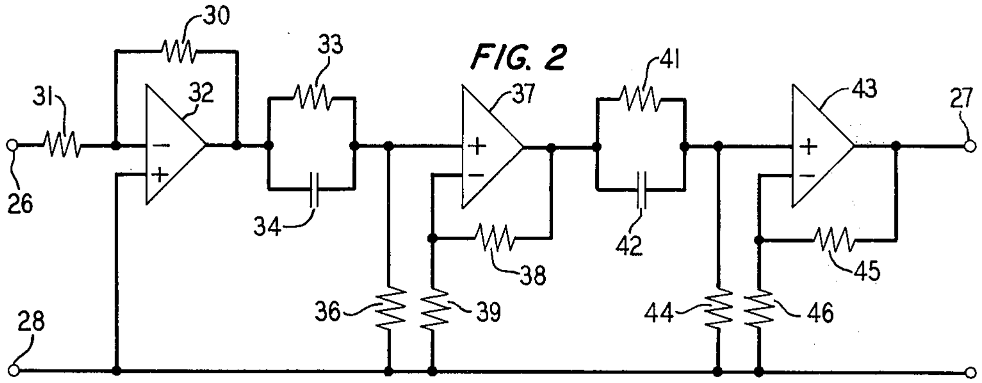
FIG. 2 schematically depicts a biquadratic filter circuit which can advantageously be employed as a voltage transfer ratio stage in an embodiment of the present invention suitable for use as a telephone hybrid balancing network in a nonloaded cable facility.

This transfer function is advantageously supplied by the biquadratic filter circuit of FIG. 2. In the circuit of FIG. 2, resistor 31 is connected between input terminal 26 and the inverting input terminal of operational amplifier 32. The noninverting input terminal of amplifier 32 is connected to common terminal 28, and the output terminal of amplifier 32 is connected to the parallel combination of resistor 33 and capacitor 34. The other terminal of parallel connected resistor 33 and capacitor 34 connects to the noninverting input terminal of operational amplifier 37, and resistor 36 is connected between the noninverting input terminal of amplifier 37 and common terminal 28. Resistors 38 and 39 are series connected between the output terminal of amplifier 37 and common terminal 28 with the junction of resistors 38 and 39 connected to the inverting input terminal of operational amplifier 37. The output terminal of amplifier 37 is also connected to the parallel connected combination of resistor 41 and capacitor 42. The second terminal of parallel connected resistor 41 and capacitor 42 is connected to the noninverting input terminal of operational amplifier 43, and resistor 44 is connected between the noninverting input terminal of amplifier 43 and common terminal 28. Resistors 45 and 46 are serially connected between the output terminal of amplifier 43 and common terminal 28, with the junction between resistors 45 and 46 connected to the inverting terminal of amplifier 43. The output terminal of amplifier 43 is connected to circuit output terminal 27.

It can be shown that the transfer function for the circuit of FIG. 2 can be expressed as $$T(s) = -K_1K_2K_3 \cdot \frac{S + \frac{1}{R_{33}C_{34}}}{S + \frac{1}{R_{33}C_{34}} + \frac{1}{R_{36}C_{34}}} \cdot \frac{S + \frac{1}{R_{41}C_{42}}}{S + \frac{1}{R_{41}C_{42}} + \frac{1}{R_{44}C_{42}}}$$

where $$K_1 = \frac{R_{30}}{R_{31}},$$

the effective closed circuit gain of operational amplifier 32;

$$K_2 = 1 + \frac{R_{38}}{R_{39}},$$

the effective high frequency closed circuit gain of operational amplifier 37; and $$K_3 = 1 + \frac{R_{45}}{R_{46}},$$

the effective high frequency closed circuit gain of operational amplifier 43.

It can be seen from this transfer function that the circuit of FIG. 2 can advantageously be employed as the voltage transfer ratio stage of the circuit arrangement of FIG. 1 to provide the driving point impedance of Equation (2). Since the transfer function gain scalar factor, $K_1K_2K_3$ is a function of resistor ratios, it can be noted that driving point impedance scalar factor, $K_a$, of Equation (2) can easily be controlled by controlling the resistance values of resistors 30, 31, 38, 39, 45, and 46 and/or controlling the resistance value of feedback resistor 29. Further, it can be noted that either of the pole-zero pairs can be selected as the fixed frequency singularity and the pair which is chosen as the variable pole and zero can be separately controlled by two circuit resistances, e.g., resistors 33 and 36 or resistors 41 and 44.

Figure 3:
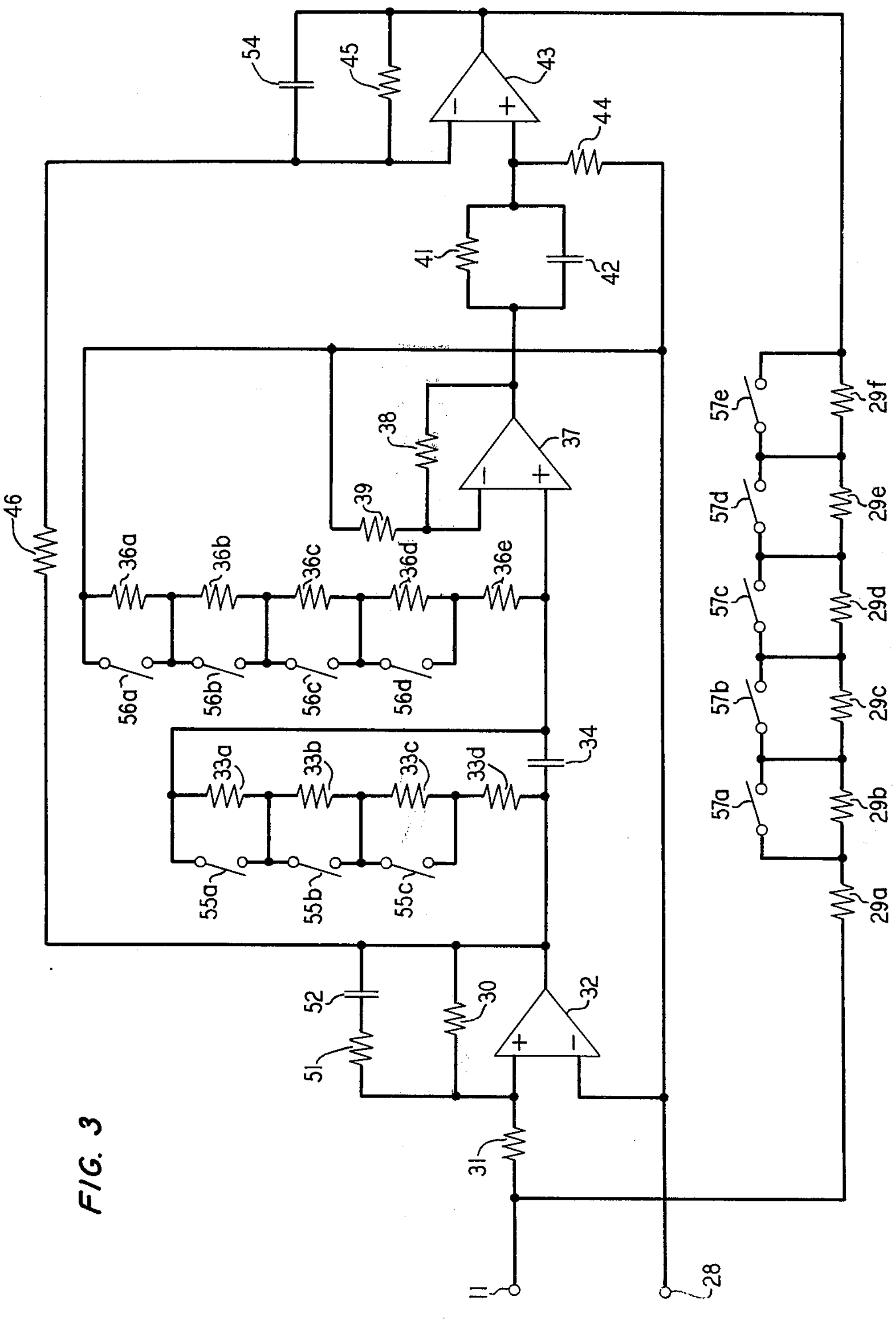
FIG. 3 schematically illustrates an adjustable hybrid balancing network which, in accordance with this invention, balances an extremely broad range of nonloaded cable facilities.

FIG. 3 depicts an adjustable balancing network for a nonloaded cable facility which incorporates the biquadratic filter network of FIG. 2 in the impedance simulating network of FIG. 1. For convenience, elements identical to those in FIGS. 1 and 2 are identified by the same identifiers.

It will be noted that the circuit embodiment depicted in FIG. 3 has not been formed by simply embedding the filter circuit of FIG. 2 in the impedance simulation arrangement of FIG. 1, but has been established so as to make multiple use of amplifiers 32 and 43, that is, amplifier 43, which is part of the biquadratic filter circuit of FIG. 2, also serves the function of summing amplifier 17 of FIG. 1, and amplifier 32, which is included in the biquadratic filter network of FIG. 2, also serves the function of buffer amplifier 13 of FIG. 1. Resistor 51 and capacitor 52, which are serially connected between the noninverting input terminal and output terminal of amplifier 32, provide a high frequency pole-zero pair which ensures adequate phase and gain margin. In a like manner, capacitor 54, connected between the inverting input and the output terminals of amplifier 43, provides a high frequency pole for additional frequency stability. Resistor 46, which is connected between the inverting input of amplifier 43 and common terminal 28 in FIG. 2, is connected between inverting input of amplifier 43 and the output terminal of amplifier 32 in the circuit of FIG. 3 in order to utilize amplifier 43 as the summing stage.

It will become apparent upon examining the impedance function for the circuit of FIG. 3 that the value of the gain constant, $K_a$, and the location of the variable pole and zero, $Z_1$ and $P_1$, in Equation (2) are controlled respectively by switches 57, 56, and 55. In the circuit of FIG. 3, resistor 33 of FIG. 2 has been replaced by four separate series-connected resistors **33*a*, 33*b*, 33*c*, and 33*d*. Switch 55*a* shunts resistor 33*a*; switch 55*b* is connected in parallel with resistor 33*b*; and switch 55*c* is connected in parallel with resistor 33*c*. Connected in this manner, the switches allow the selection of eight separate values for resistor 33. This, in turn, allows the circuit of FIG. 3 to establish eight separate pole locations. In a similar manner, switch 56 is connected so that switch 56*a* is connected in parallel with resistor 36*a*; switch 56*b* is connected in parallel with switch 36*b*; and switch 56*c* and switch 56*d* are respectively connected in parallel with resistors 36*c* and 36*d*. This arrangement allows 16 distinct resistor values to be established thereby providing 16 separate zero locations. Resistor 29 has been replaced by series-connected resistors 29*a* through 29*f*. Five of these resistors are respectively bypassed by switches 57*a* through 57*e*. This arrangement provides 32 distinct resistance values for feedback resistor 29**, which, in turn, allows 32 selectable values of $K_a$.

It can be shown that if $$\frac{R_{30}}{R_{31}} = \frac{R_{46}}{R_{45}}$$

the input impedance or driving point impedance of the circuit of FIG. 3 is $$Z(s) = \frac{1}{\frac{T_a(s)}{R_{e1}} + \frac{1}{R_{31}}} \tag{3}$$

where $T_a(s)$ is the adjustable voltage transfer ratio established by the biquadratic filter section, and $R_{el}$ is the effective resistance of the arrangement of resistors **29*a* through 29*f* and switches 57*a* through 57*e*. The term $1/R_{31}$ in this equation reflects the deviation of amplifier 32** from an ideal buffer amplifier, since the term results from the finite current which flows into the noninverting input terminal of the amplifier.

By selecting a large resistance value for resistor 31, the input current of amplifier 32 becomes negligible and Equation (3) becomes identical in form to Equation (2), substantially being $$Z(s) = \frac{R_{e1}}{K_1K_2K_3} \cdot \frac{S + \frac{1}{R_{e2}C_{34}} + \frac{1}{R_{e3}C_{34}}}{S + \frac{1}{R_{e2}C_{34}}} \cdot \frac{S + \frac{1}{R_{41}C_{42}} + \frac{1}{R_{44}C_{42}}}{S + \frac{1}{R_{41}C_{42}}}$$

where $R_{e2}$ is the effective resistance of the combination of switches 55 and resistors 33 and $R_{e3}$ is the effective resistance of the combination of switches 56 and resistors 36.

In this embodiment of the invention it has been found advantageous to establish the scalar product $K_1K_2K_3$ on the basis of the dynamic range requirements, the system noise requirements and to also limit the amount of current drawn from the output of amplifier 43. Further, since a hybrid silicon-integrated discrete resistor and capacitor configuration is often desirable, it is often advantageous to select capacitors 34 and 42 on the basis of physical size.

In one embodiment of the circuit of FIG. 3, which has been found to satisfactorily balance virtually all present-day nonloaded cable installations, scalar factors $K_1K_2K_3$ were respectively established substantially equal to 1, 3, and 2; the fixed zero and pole frequencies were established at 100,000 and 40,000 radians sec., respectively; the variable zeros were established at selectable frequencies substantially between 24,400 and 184,000 radians/sec.; the scalar factor, $K_a$, was selectable within the range of 40 to 283; and the variable poles were selectable substantially within the frequency range of 14,400 to 144,000.

EMBODIMENT AS A HYBRID BALANCING NETWORK IN A TELEPHONE REPEATER FOR LOADED CABLE INSTALLATIONS

Loaded cable installations are characterized by loading coils placed at substantially equal intervals along the length of the transmission line. As is known in the art, loaded cable facilities are often used in long transmission lines, since the loading coils decrease the cable losses within the frequency range of 500 Hz. to 4000 Hz. It has been found that a balancing network which simulates the impedance of an H88 loaded cable, that is, a loaded cable having 88 millihenry loading coils on H or 6000 ft. spacing, can be realized by an embodiment of the present invention. More particularly, it has been found that an embodiment of this invention can balance H88 loaded transmission lines of various gauge construction, including 19, 22, 24, and 26 gauge cables varying in length from 18,000 ft. to 114,000 ft.

In the practice of this invention, if the loaded cable does not contain a near-end section which is less than 6000 ft., a driving point impedance of the form $$Z(s) = K_b \cdot \frac{S + Z_1}{S + P_1} \cdot \frac{S^2 + \frac{\omega_Z}{Q_Z}S + \omega_Z^2}{S^2 + \frac{\omega_P}{Q_P}S + \omega_P^2} \qquad (4)$$

can balance substantially all H88 loaded cable installations, where $K_b$ is a gain factor equal to the gain at infinite frequency, $Z_1$ and $P_1$ are respectively a low frequency zero and pole, $\omega_Z$ and $\omega_P$ are respectively a pair of complex conjugate high frequency zeros and poles and $Q_Z$ and $Q_P$ are respectively the $Q$ of the high frequency poles and zeros. Moreover, it has been found that the low frequency pole $P_1$ and the high frequency parameters $\omega_Z$, $\omega_P$, $Q_Z$, and $Q_P$ can be fixed or constant and that satisfactory balance for substantially all present-day installations of H88 cable can be achieved by controlling the frequency of the low frequency zero, $Z_1$, and by controlling the value of the scalar gain factor $K_b$.

Thus, if the near-end section of an H88 facility is made to appear as a 6000 ft. section by means of line build-out capacitors placed in parallel with the telephone line at the location of the repeater, an adjustable balancing network can be realized by the circuit arrangement of FIG. 1 in which the transfer function of voltage transfer ratio stage 18 is $$T_b(s) = \frac{R_{29}}{K_b} \cdot \frac{S + P_1}{S + Z_1} \cdot \frac{S^2 + \frac{\omega_P}{Q_P}S + \omega_P^2}{S^2 + \frac{\omega_Z}{Q_Z}S + \omega_Z^2} \qquad (5)$$

Figure 4:
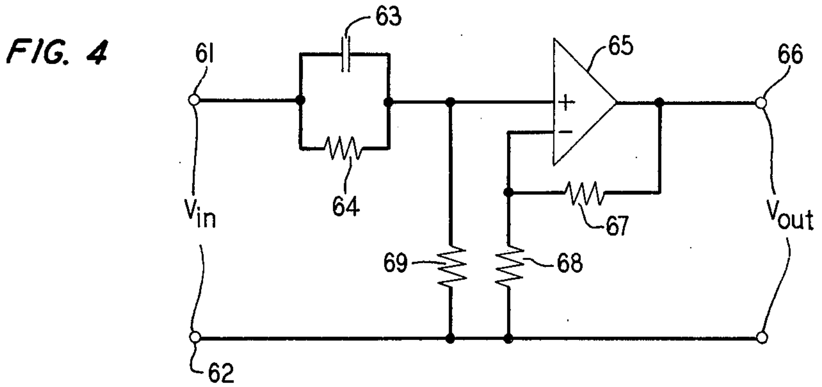
FIG. 4 depicts a circuit suitable for use within a transfer voltage ratio stage of the present invention for realizing a single transmission pole and zero.

FIG. 4 depicts a circuit which satisfactorily provides the low frequency pole and zero required in the transfer function of Equation (5). In the circuit of FIG. 4, an input terminal 61 is connected to the noninverting input terminal of operational amplifier 65 by means of a parallel connected capacitor 63 and resistor 64. Resistor 69 is connected between the noninverting input terminal of amplifier 65 and common terminal 62. Resistors 67 and 68 are serially connected between common terminal 62 and the commonly connected amplifier 65 output terminal and output terminal 66 of the circuit stage, and the inverting input terminal of amplifier 65 is connected to the junction of resistors 67 and 68. It can be shown that the transfer function of the circuit of FIG. 4 is $$\frac{V_{out}}{V_{in}} = K_1 \frac{S + \frac{1}{R_{64}C_{63}}}{S + \frac{1}{R_{64}C_{63}} + \frac{1}{R_{69}C_{63}}} \qquad (6)$$

where $$K_1 = 1 + \frac{R_{67}}{R_{68}}.$$

It can be recognized that the circuit of FIG. 4 is especially advantageous in that the transfer function pole—and thus the driving point impedance zero—can be controlled or varied in frequency without affecting either the transfer function zero location or the gain factor simply by controlling the value of resistor 69.

Figure 5:
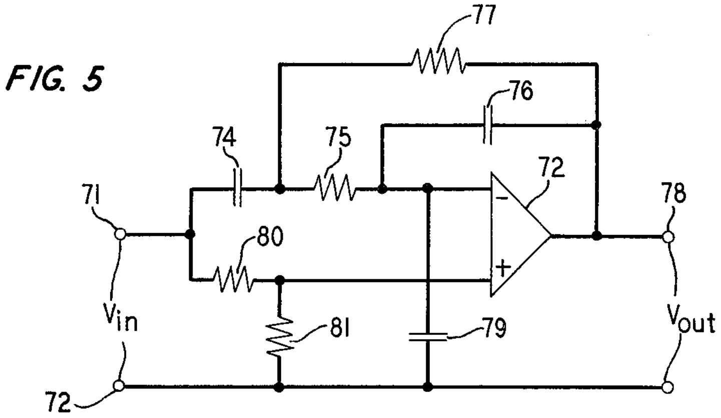
FIG. 5 depicts a low-noise single amplifier biquadratic filter circuit suitable for use within a transfer voltage ratio stage of the present invention.

FIG. 5 depicts a circuit for satisfactorily realizing the complex conjugate pair of high frequency poles and zeros, $\omega_Z$ and $\omega_P$. This circuit is a single operational amplifier biquadratic filter which is especially suited for the practice of this invention, since the circuit low frequency noise effectively equals the noise performance of the operational amplifier employed. In the circuit of FIG. 5, circuit stage input terminal 71 is connected to the inverting input terminal of operational amplifier 72 by a series-connected circuit branch comprising capacitor 74 and resistor 75. The output terminal of amplifier 72 is connected to the stage output terminal 78. In addition, the output terminal of amplifier 72 is connected to the amplifier inverting input terminal by capacitor 76 and the amplifier output terminal is connected to the junction of capacitor 74 and resistor 75 by resistor 77. The inverting input terminal of amplifier 72 is connected to common terminal 73 by capacitor 79. Resistor 80 is connected between input terminal 71 and the noninverting input terminal of amplifier 72 and resistor 81 is connected between the noninverting input terminal of amplifier 72 and common terminal 73.

It can be shown that the transfer function from circuit of FIG. 5 is $$\frac{V_{out}}{V_{in}} = K_2 \frac{S^2 + \frac{E}{K_2} S + \frac{D}{K_2}}{S^2 + A S + B} \qquad (7)$$

where $$K_2 = \left[1 + \frac{C_{79}}{C_{76}}\right]\left[1 + \frac{R_{80}}{R_{81}}\right]$$

$$A = \frac{1}{C_{74}}\left[\frac{1}{R_{77}} + \frac{1}{R_{75}}\right]$$

$$B = \frac{1}{R_{75}R_{77}C_{74}C_{76}}$$

$$D = \frac{1}{R_{75}R_{77}C_{74}C_{76}} \cdot \frac{1}{\left[1 + \frac{R_{80}}{R_{81}}\right]}$$

$$E = \frac{1}{R_{75}C_{76}}\left[\frac{1}{\left[1 + \frac{R_{80}}{R_{81}}\right]} - 1\right] + K_2 A .$$

Thus, it can be realized that the required transfer function for the load cable balancing network which is expressed by Equation (5) can be obtained by cascading the circuits of FIG. 4 and FIG. 5. Further, the variable or adjustable zero of the driving point impedance function can be obtained by adjusting or varying the pole frequency circuit of FIG. 4 and the variable or adjustable scalar factor $K_b$ can conveniently be provided by controlling the value of feedback resistor 29. Although this cascaded arrangement could be embedded in the circuit arrangement of FIG. 1 to provide a satisfactory balancing network, it has been determined that certain circuit economies can be attained by utilizing operational amplifier 65 to accomplish both the summing operations of amplifier 17 in FIG. 1 and the realization of the low frequency pole and zero.

Figure 6:
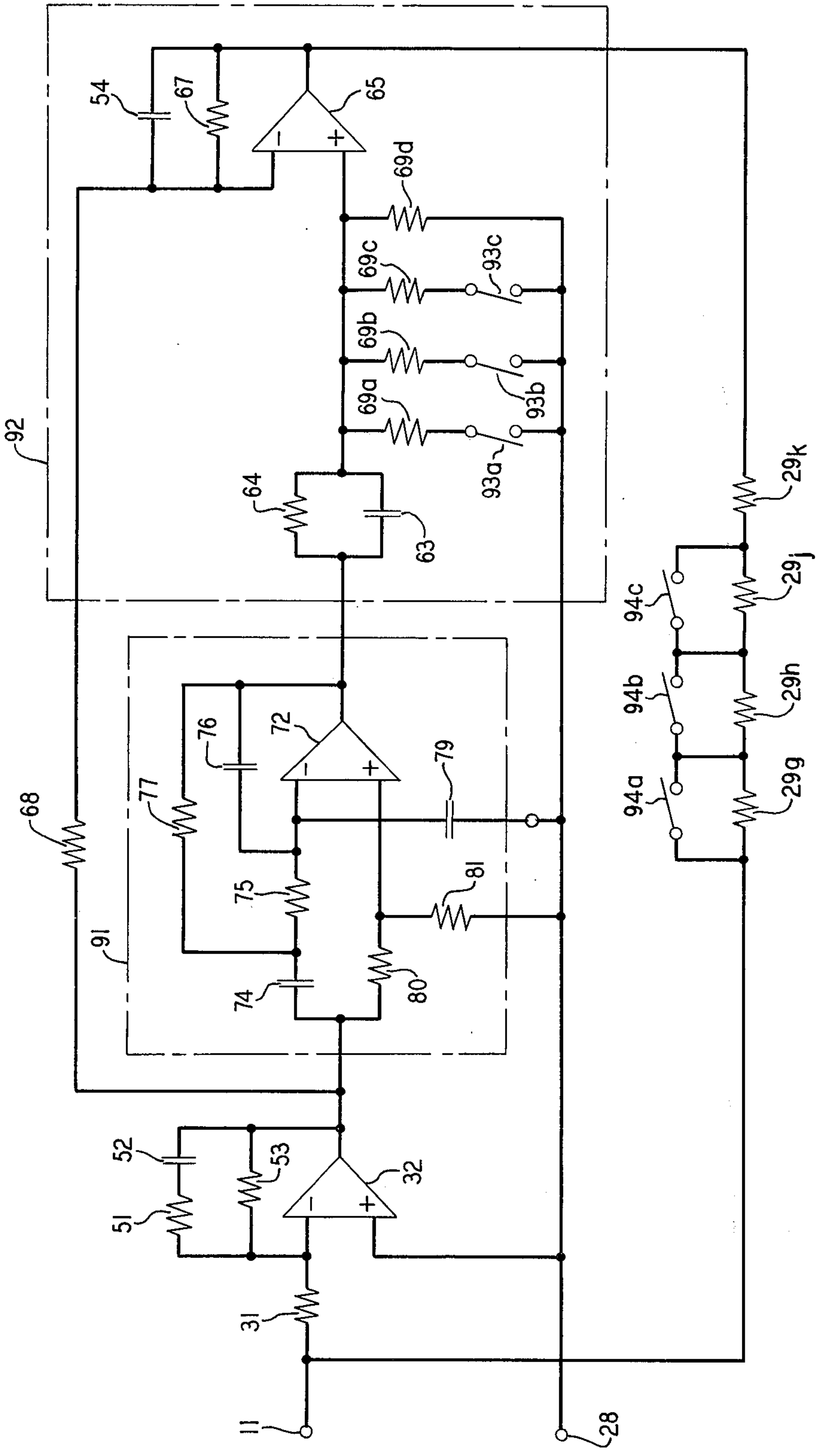
FIG. 6 depicts an embodiment of the present invention which is an adjustable hybrid balancing network for balancing a wide range of loaded cable installations.

The circuit of FIG. 6 depicts a circuit embodiment which includes this combination of the summing operation and low frequency pole-zero realization and further includes frequency compensation and controlled resistance networks which have been found to satisfactorily balance the previously mentioned range of H88 loaded cable facilities. For convenience, elements of FIG. 6 identical to elements of FIGS. 1, 3, 4, and 5 have been labeled with the same identifiers used in these figures. In FIG. 6 the circuit of FIG. 5 for realizing the pair of complex conjugate zeros and poles is contained within the dashed outline 91, and the circuit for realizing the high frequency real pole-zero pair is contained within the dashed outline 92. As in the nonloaded cable balancing network embodiment of FIG. 3, high frequency compensation is provided by series-connected resistor 51 and capacitor 52, which are connected between the input and output terminals of amplifier 32 and by capacitor 54, which is connected between the inverting input terminal and the output terminal of amplifier 65. Resistor 69 of the low frequency pole-zero realization stage 92 has been replaced by resistors 69*a* through 69*d* and associated switches 93*a* through 93*c*. Resistors 69*a* through 69*c* are series connected with switches 93*a* through 93*c* between the noninverting input terminal of amplifier 65 and common terminal 28, whereas resistor 69*d* is connected directly between the noninverting terminal of amplifier 65 and the common terminal 28. In this arrangement activation of the various switches 93 results in eight separate resistance values and thus in eight different zero frequencies in the driving point impedance. Feedback resistor 29 of FIG. 6 has also been replaced by series-connected resistors 29*g* through 29*k* and associated switches 94*a* through 94*c* which are connected in parallel with resistors 29*g*, *h*, and *j*, respectively. This arrangement results in eight selectable values of feedback resistance and accordingly in eight selectable values of scalar multiplier $K_b$. In view of Equations (4), (6), and (7), it can be seen that the driving point impedance of the circuit of FIG. 6 can be expressed as $$Z(s) = \frac{R'_{29}}{K_1K_2K_3} \cdot \frac{S^2 + \frac{E}{K_2} S + \frac{D}{K_2}}{S^2 + As + B} \cdot \frac{S + \frac{1}{R_{64}C_{63}}}{S + \frac{1}{R_{64}C_{63}} + \frac{1}{R'_{69}C_{63}}}$$

where $$K_3 = \frac{R_{53}}{R_{51}},$$

the effective gain of amplifier 32;

$R_{29}'$ equals the effective resistance of the combination of switches 94*a* through 94*c* and resistors 29*g* through 29*k*; and $R_{69}'$ equals the effective resistance of the combination of switches 93a through 93c and associated resistors 69a through 69d.

As in the nonloaded cable balancing network of FIG. 3, the value of the gain product $K_1K_2K_3$ can be advantageously chosen to provide adequate dynamic range and noise performance while simultaneously minimizing the current drawn from the output circuit of amplifier 65.

In one embodiment of the circuit of FIG. 6, $K_1$ was established equal to 2; $K_2$ was set equal to 5; and $K_3$ was set equal to 1. In addition, the low frequency pole of the driving point impedance was established at 1260 radians per second. The high frequency pole was established at 1980 radians per second with a Q factor of 1.2 and the high frequency zeros were set at 50,000 radians per second with a Q factor of 1.1. The eight high frequency pole locations which are determined by switches 93a, 93b, and 93c and associated resistors 69a through 69d were established between approximately 2600 radians per second and 5150 radians per second, and the eight values of $K_b$ which are determined by switches 94a through 94c and associated resistors 29g through 29k were established in equal increments between 104 and 146.

It is to be understood that the above-discussed embodiments of FIGS. 3 and 6 are illustrative of the principles of this invention and that numerous other arrangements may be devised by those skilled in the art without departing from the scope and spirit of this invention. For example, in the circuits of FIGS. 3 and 6 any number of variable resistance means can be employed in place of the switch and resistor arrangements depicted. Further, the choice of the values for the various gain factors, e.g., $K_1$, $K_2$, $K_3$, can be varied to some degree from the particular values discussed herein without substantially degrading the performance of the disclosed balancing networks.

What is claimed is:

1. A circuit for realizing a predetermined driving point impedance between an input terminal and a terminal of fixed potential comprising:

a first amplifier stage having first and second input terminals and an output terminal;

a second amplifier stage having an input terminal and an output terminal, said input terminal of said second amplifier connected to the input terminal of said circuit for realizing a driving point impedance, said output terminal of said second amplifier connected to said first input terminal of said first amplifier;

a voltage transfer ratio stage connected between said output terminal of said second amplifier and said second input terminal of said first amplifier, said voltage transfer ratio stage having a transfer function with poles and zeros respectively substantially identical to the zeros and poles of said predetermined driving point impedance;

feedback resistance means connected between said output terminal of said first amplifier and said input terminal of said second amplifier; and means for connecting said terminal of fixed potential to circuit nodes of identical fixed potential within said voltage transfer ratio stage, and said first and second amplifier stages.

2. The circuit of claim 1 wherein said second amplifier stage is a noninverting amplifier stage, said first input terminal of said first amplifier stage is a noninverting input terminal and said second input terminal of said first amplifier is an inverting input terminal.

3. The circuit of claim 1 wherein said second amplifier stage is an inverting amplifier, said first input terminal of said first amplifier stage is an inverting input terminal of said second input terminal of said first amplifier stage is a noninverting input terminal.

4. A circuit for realizing a predetermined impedance between a first input terminal and a common input terminal comprising:

an operational summing amplifier having a first and second input terminal, an output terminal and a common terminal;

an operational isolation amplifier having an input terminal, an output terminal, and a common terminal, said input terminal of said isolation amplifier connected to said first input terminal of said impedance realizing circuit and said output terminal of said isolation amplifier connected to said first input terminal of said summing amplifier;

a voltage transfer ratio stage having an input terminal, an output terminal and a common terminal, said input terminal of said voltage transfer ratio stage connected to said output terminal of said isolation amplifier and said output terminal of said voltage transfer ratio stage connected to said second input terminal of said summing amplifier;

resistive feedback means connected between said output terminal of said summing amplifier and said input terminal of said isolation amplifier, and means for connecting said common input terminal of said impedance simulating circuit to the common terminals of said isolation amplifier, said summing amplifier, and said voltage transfer ratio stage.

5. The circuit of claim 4 wherein said isolation amplifier is a noninverting amplifier, said first input terminal of said summing amplifier is a noninverting input terminal and said second input terminal of said summing amplifier is an inverting input terminal.

6. The circuit of claim 4 wherein said isolation amplifier is an inverting amplifier, said first input terminal of said summing amplifier is an inverting input terminal and said second input terminal of said summing amplifier is a noninverting input terminal.

7. A telephone system hybrid circuit balancing network having first and second input terminals comprising:

a first operational amplifier having first and second input terminals and an output terminal;

a second operational amplifier having an input terminal and an output terminal, said input terminal of said second operational amplifier connected to said first input terminal of said balancing network and said output terminal of said second operational amplifier connected to said first input terminal of said first operational amplifier;

voltage transfer ratio means connected between said output terminal of said second operational amplifier and said second input terminal of said first operational amplifier, said voltage transfer ratio means having a transfer function substantially identical to a scalar multiplier times the inverse of the impedance function of the telephone cable connected to said hybrid circuit;

feedback resistance means connected between said output terminal of said first operational amplifier and said input terminal of said second operational amplifier; and means for connecting said second input terminal of said balancing network to the common terminals of said voltage transfer ratio means, and said first and second operational amplifiers.

8. The balancing network of claim 7 wherein said voltage transfer means includes means for selectively controlling the frequency of at least one of the poles and zeros of said transfer function.

9. The balancing network of claim 8 wherein the resistance of said feedback resistance means is selectable from a plurality of resistance values to thereby control said impedance function scalar multiplier.

10. The balancing network of claim 9 wherein said transfer function of said voltage transfer ratio stage comprises two pole-zero pairs, one of said pole-zero pairs fixed in frequency, the frequency of the second pole and the frequency of the second zero selectable from a plurality of predetermined frequencies.

11. The balancing network of claim 10 wherein the frequency of said second zero is selectable from eight predetermined frequencies, the frequency of said second pole is selectable from 16 predetermined frequencies, and the resistance value of said feedback resistance means is selectable from 32 resistance values.

12. The balancing network of claim 9 wherein said transfer function of said voltage transfer ratio stage comprises a real pole-zero pair and a pair of complex conjugate poles and zeros, said complex conjugate poles and zeros fixed in frequency, said real zero fixed in frequency and said frequency of said real pole is selectable from a plurality of fixed frequencies.

13. The balancing network of claim 12 wherein said frequency of said real pole is selectable from eight predetermined frequencies and the resistance value of said feedback resistance means is selectable from eight predetermined resistance values.

14. A balancing network for use in a hybrid circuit of a telephone circuit comprising:

first and second operational amplifiers, the input terminal of said first operational amplifier connected to a first input terminal of said balancing network and the output terminal of said first operational amplifier connected to a first input terminal of said second operational amplifier;

a voltage transfer ratio stage connected between said output terminal of said first operational amplifier and a second input terminal of said second operational amplifier;

feedback resistance means connected between the output terminal of said second operational amplifier and said input terminal of said first operational amplifier; and means for connecting circuit terminals of said voltage transfer ratio stage and said first and second operational amplifiers having a common fixed potential to a second input terminal of said balancing network.

15. The balancing network of claim 14 wherein said voltage transfer ratio stage is a biquadratic filter circuit including third, fourth, and fifth operational amplifiers, each of said third, fourth and fifth operational amplifiers having first and second input terminals and an output terminal, the input terminal of said voltage transfer ratio stage connected to the first input terminal of said third operational amplifier by a first resistor, said second input terminal of said third operational amplifier connected to a terminal of fixed potential, said first input terminal and said output terminal of said third operational amplifier connected by a second resistor, said output terminal of said fourth operational amplifier connected to said terminal of fixed potential by series-connected third and fourth resistors with the junction of said third and fourth resistors connected to said first input terminal of said fourth operational amplifier, said output terminal of said fifth operational amplifier connected to said terminal of fixed potential by series-connected fifth and sixth resistors with the junction of said fifth and sixth resistors connected to said first input terminal of said fifth operational amplifier, said voltage transfer ratio stage further including a seventh resistor and a first capacitor connected in parallel between said output terminal of said third operational amplifier and said second input terminal of said fourth operational amplifier, an eighth resistor connected in parallel with a second capacitor between said output terminal of said fourth operational amplifier and said second input terminal of said fifth operational amplifier, a ninth resistor connected between said second input terminal of said fourth operational amplifier and said terminal of fixed potential and a tenth resistor connected between said second input terminal of said fifth operational amplifier and said terminal of fixed potential.

16. The balancing network of claim 15 wherein said seventh and ninth resistors are respectively a first and second variable resistance means.

17. The balancing network of claim 16 wherein said first variable resistance means comprises four series connected resistors, three of said four series connected resistors having a switch connected in parallel therewith, and said second variable resistance means comprises five series connected resistors, four of said resistors having a switch connected in parallel therewith.

18. The balancing network of claim 14 wherein said voltage transfer ratio stage comprises the cascade connection of a real pole-zero stage and a single amplifier biquadratic filter stage, said real pole-zero stage including a third operational amplifier, having first and second input terminals and an output terminal, a first resistor connected in parallel with a first capacitor between the input terminal of said real pole-zero stage and said first input terminal of said third amplifier, a second resistor connected between said first input terminal of said third amplifier and a terminal of fixed potential, a third resistor connected between said second input terminal of said third amplifier and said terminal of fixed potential, and a fourth resistor connected between said second input terminal of said third operational amplifier and the commonly connected output terminal of said third amplifier and output terminal of said real pole-zero stage, said single amplifier biquadratic filter stage including a fourth operational amplifier having first and second input terminals and an output terminal, a second capacitor connected between said output terminal and said first input terminal of said fourth operational amplifier, a third capacitor and fifth resistor series connected between the input terminal of said biquadratic filter stage and said first input terminal of said fourth operational amplifier, a sixth resistor connected from the junction of said series connected third capacitor and fifth resistor to the output terminal of said fourth amplifier, a seventh resistor connected between said input terminal of said biquadratic filter stage and said second input terminal of said fourth operational amplifier, an eighth resistor connected between said fourth operational amplifier second input terminal and said terminal of fixed potential, and a fourth capacitor connected between said terminal of fixed potential and said fourth operational amplifier first input terminal.

19. The balancing network of claim 18 wherein said second resistor of said real pole-zero stage is a variable resistance means.

20. The balancing network of claim 19 wherein said variable resistance means comprises four series-connected resistors, three of said four resistors having a switch connected in parallel therewith.

21. A balancing network having first and second input terminals for use in a telephone repeater of a nonloaded cable facility comprising:

first, second and third operational amplifiers, each of said amplifiers having an inverting input terminal, a noninverting input terminal and an output terminal, said inverting input terminal of said first operational amplifier connected to said balancing network second input terminal;

a first resistor connected between said balancing network first input terminal and said noninverting input terminal of said first operational amplifier;

a second resistor connected between said noninverting input terminal and said output terminal of said first operational amplifier;

a first capacitor connected between said output terminal of said first operational amplifier and said noninverting input terminal of said second operational amplifier;

a circuit branch including series-connected third, fourth, fifth and sixth resistors, said circuit branch connected in parallel with said first capacitor;

first, second and third switches, said switches respectively connected in parallel with said fourth, fifth and sixth resistors;

seventh, eighth, ninth, tenth and eleventh resistors series connected between said noninverting input terminal of said second operational amplifier and said second input terminal of said balancing network;

fourth, fifth, sixth and seventh switches respectively connected in parallel with said eighth, ninth, tenth and eleventh resistors;

twelfth and thirteenth resistors connected between said output terminal of said second operational amplifier and said second input terminal of said balancing network with the junction between said twelfth and thirteenth resistors connected to said inverting input terminal of said second operational amplifier;

a fourteenth resistor and a second capacitor connected in parallel between the output terminal of said second operational amplifier and the noninverting input terminal of said third operational amplifier;

a fifteenth resistor connected between said third operational amplifier noninverting input terminal and said second input terminal of said balancing network;

a sixteenth resistor connected between said output terminal and said inverting input terminal of said third operational amplifier;

a seventeenth resistor connected between said inverting input terminal of said third operational amplifier and said output terminal of said first operational amplifier;

eighteenth, nineteenth, twentieth, twenty-first, twenty-second and twenty-third resistors series connected between said output terminal of said third operational amplifier and said balancing network first input terminal; and twelfth, thirteenth, fourteenth, fifteenth and sixteenth switches respectively connected in parallel with said nineteenth, twentieth, twenty-first, twenty-second, and twenty-third resistors.

22. The balancing network of claim 21 further comprising a third capacitor connected between the inverting input terminal and the output terminal of said third operational amplifier and a fourth capacitor and twenty-fourth resistor series connected between the noninverting input terminal and output terminal of said first operational amplifier.

23. A balancing network, having first and second input terminals, for use in a telephone repeater of an H88 loaded cable facility comprising:

first, second and third operational amplifiers having a noninverting input terminal, an inverting input terminal and an output terminal, the noninverting input terminal of said first operational amplifier connected to said balancing network second input terminal;

a first resistor connected between said balancing network first input terminal and said first operational amplifier inverting input terminal;

a second resistor connected between said first amplifier inverting input terminal and output terminal;

a first capacitor and a third resistor respectively connected in series between the output terminal of said first amplifier and the inverting input terminal of said second amplifier;

a fourth resistor connected between said output terminal of said first amplifier and said noninverting input terminal of said second amplifier;

a fifth resistor connected between said second amplifier noninverting input terminal and said balancing network second input terminal;

a sixth resistor connected from the junction of said first capacitor and said third resistor to the output terminal of said second amplifier;

second and third capacitors series connected between said output terminal of said second amplifier and said balancing network second input terminal, the junction of said second and third capacitors connected to said second amplifier inverting input terminal;

a fourth capacitor and seventh resistor connected in parallel between said output terminal of said second amplifier and said noninverting input terminal of said third amplifier;

a first controllable resistance including an eighth resistor and a plurality of circuit branches connected in parallel between said balancing network second input terminal and said noninverting input terminal of said third amplifier, each of said circuit branches including a resistor and a series connected switch;

a ninth resistor connected between said output terminal and said inverting input terminal of said third amplifier;

a tenth resistor connected between said third amplifier inverted input terminal and said first amplifier output terminal; and a second controllable resistance connected between said third amplifier output terminal and said first input terminal of said balancing network, said second controllable resistance including an eleventh resistor series connected with a plurality of resistors, each having a switch connected in parallel therewith.

24. The balancing network of claim 23 further comprising a twelfth resistor connected in series with a fifth capacitor between said inverting input terminal and said output terminal of said first amplifier and a sixth capacitor connected between said inverting input terminal and said output terminal of said third amplifier.

* * * * *

UNITED STATES PATENT AND TRADEMARK OFFICE

CERTIFICATE OF CORRECTION

PATENT NO. : 3,919,502

DATED : November 11, 1975

INVENTOR(S) : Gobind T. Daryanani

It is certified that error appears in the above-identified patent and that said Letters Patent are hereby corrected as shown below:

Column 3, Equation I should read:

$$T(s) = \frac{e_o}{e_i} = K \cdot \frac{\Pi_{i=1}^{k} (s+Z_i)}{\Pi_{i=1}^{k} (s+P_i)} \cdot \frac{\Pi_{i=1}^{n} \left(s^2 + \frac{\omega_{Zi}}{Q_{Zi}} s + \omega_{Zi}^2\right)}{\Pi_{i=1}^{n} \left(s^2 + \frac{\omega_{Pi}}{Q_{Pi}} s + \omega_{Pi}^2\right)}$$

Column 3, line 9, change "jw" should read --jω--.

Column 5, Equation should read:

$$T(s) = -K_1K_2K_3 \cdot \frac{S + \frac{1}{R_{33}C_{34}}}{S + \frac{1}{R_{33}C_{34}} + \frac{1}{R_{36}C_{34}}} \cdot \frac{S + \frac{1}{R_{41}C_{42}}}{S + \frac{1}{R_{41}C_{42}} + \frac{1}{R_{44}C_{42}}}$$

Column 7, Equation I should read:

$$Z(s) = \frac{R_{e1}}{K_1K_2K_3} \cdot \frac{S + \frac{1}{R_{e2}C_{34}} + \frac{1}{R_{e3}C_{34}}}{S + \frac{1}{R_{e2}C_{34}}} \cdot \frac{S + \frac{1}{R_{41}C_{42}} + \frac{1}{R_{44}C_{42}}}{S + \frac{1}{R_{41}C_{42}}}$$

Signed and Sealed this

*sixth* Day of *April 1976*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,919,502

DATED : November 11, 1975

INVENTOR(S) : Gobind T. Daryanani

It is certified that error appears in the above-identified patent and that said Letters Patent are hereby corrected as shown below:

Column 3, line 56, the equation should read $$-- \ Z(s) = \frac{R_{29}}{T(s)} \ -- .$$

Column 6, line 30, cancel "pole and zero" and substitute --zero and pole--. Column 8, line 7, cancel "poles and zeros" and substitute --zeros and poles--. Column 10, line 52, the equation should read $$-- \ Z(s) = \frac{R'_{29}}{K_1 K_2 K_3} \cdot \frac{s^2 + As + B}{s^2 + \frac{E}{K_2}s + \frac{D}{K_2}} \cdot \frac{s + \frac{1}{R_{64}C_{63}} + \frac{1}{R'_{69}C_{63}}}{s + \frac{1}{R_{64}C_{63}}} \ -- .$$

Signed and Sealed this

*Fourth* Day of *October 1977*

[SEAL]

*Attest:*

RUTH C. MASON
*Attesting Officer*

LUTRELLE F. PARKER
*Acting Commissioner of Patents and Trademarks*